United States Patent
Brace et al.

(10) Patent No.: US 9,441,325 B2
(45) Date of Patent: *Sep. 13, 2016

(54) ATMOSPHERIC PLASMA TREATMENT OF REINFORCEMENT CORDS AND USE IN RUBBER ARTICLES

(71) Applicant: The Goodyear Tire & Rubber Company, Akron, OH (US)

(72) Inventors: Lauren Elizabeth Brace, Cleveland, OH (US); Frederic Gerard Auguste Siffer, Petite Rosselle (FR); James Gregory Gillick, Akron, OH (US); Dinesh Chandra, Akron, OH (US); Ralf Mruk, Lipperscheid (LU); William Paul Francik, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 589 days.

This patent is subject to a terminal disclaimer.

(21) Appl. No.: 14/021,429

(22) Filed: Sep. 9, 2013

(65) Prior Publication Data

US 2014/0099460 A1    Apr. 10, 2014

Related U.S. Application Data

(60) Provisional application No. 61/709,467, filed on Oct. 4, 2012.

(51) Int. Cl.
*C08J 7/18*       (2006.01)
*D07B 1/06*       (2006.01)
(Continued)

(52) U.S. Cl.
CPC ............... *D07B 1/0606* (2013.01); *B05D 1/62* (2013.01); *B60C 9/00* (2013.01); *C08J 5/06* (2013.01); *C08J 2309/00* (2013.01); *Y10T 428/1386* (2015.01); *Y10T 428/296* (2015.01)

(58) Field of Classification Search
None
See application file for complete search history.

(56) References Cited

U.S. PATENT DOCUMENTS 3,817,778 A    6/1974 Wright
3,835,082 A    9/1974 Wright
(Continued)

FOREIGN PATENT DOCUMENTS

CN    1302257 A    7/2001
CN    1468154 A    1/2004
(Continued)

OTHER PUBLICATIONS

Kang, H.M., et al., Surface Modification of Steel Tire Cords via Plasma Etching and Plasma Polymer Coating: Part 1 Adhesive Properties, Adhesive Properties, Mar. 22, 2000, 53-62, 35, Elastomer Seoul.

(Continued)

*Primary Examiner* — Robert S Walters, Jr.
(74) *Attorney, Agent, or Firm* — John D. DeLong

(57) ABSTRACT

The present invention is directed to a method of making a cord-reinforced rubber article, comprising the steps of
(A) atomizing a mixture of a halogenated hydrocarbon, a carrier gas, and at least one member of the group consisting of hydrocarbon sulfides and polymerizable monomers, to form an atomized mixture;
(B) generating an atmospheric pressure plasma from the atomized mixture;
(C) exposing a reinforcement cord to the atmospheric pressure plasma to produce a treated reinforcement cord; and
(D) contacting the treated reinforcement cord with a rubber composition comprising a diene based elastomer and at least one member of the group consisting of methylene donors and methylene acceptors.

12 Claims, 1 Drawing Sheet

(51) Int. Cl.
  *B05D 1/00* (2006.01)
  *B60C 9/00* (2006.01)
  *C08J 5/06* (2006.01)

(56) References Cited

U.S. PATENT DOCUMENTS

| | | | |
|---|---|---|---|
| 4,269,250 | A | 5/1981 | Harrison |
| 4,284,543 | A | 8/1981 | Hollis |
| 4,421,899 | A | 12/1983 | Yamazaki et al. |
| 4,436,853 | A | 3/1984 | Schloman, Jr. |
| 4,606,930 | A | 8/1986 | Ueno et al. |
| 4,636,435 | A | 1/1987 | Yanagihara et al. |
| 4,693,927 | A | 9/1987 | Nishikawa et al. |
| 4,804,436 | A | 2/1989 | Debroche et al. |
| 4,850,412 | A | 7/1989 | Gupta |
| 4,906,680 | A | 3/1990 | Umeda et al. |
| 5,041,304 | A | 8/1991 | Kusano et al. |
| 5,053,246 | A | 10/1991 | Shuttleworth et al. |
| 5,283,119 | A | 2/1994 | Shuttleworth et al. |
| 5,284,543 | A | 2/1994 | Kusano et al. |
| 5,290,378 | A | 3/1994 | Kusano et al. |
| 5,365,988 | A | 11/1994 | Soderberg et al. |
| 5,376,413 | A | 12/1994 | Callebert et al. |
| 5,399,832 | A | 3/1995 | Tanisaki et al. |
| 5,414,324 | A | 5/1995 | Roth et al. |
| 5,501,880 | A | 3/1996 | Parker et al. |
| 5,878,564 | A | 3/1999 | De Vos et al. |
| 6,096,156 | A | 8/2000 | Morin et al. |
| 6,120,911 | A | 9/2000 | Beers et al. |
| 6,425,426 | B1 | 7/2002 | Osborne et al. |
| 6,436,481 | B1 | 8/2002 | Chabrecek et al. |
| 6,497,954 | B1 | 12/2002 | Morin et al. |
| 6,533,008 | B1 | 3/2003 | Lickes et al. |
| 6,610,068 | B1 | 8/2003 | Yang |
| 6,613,394 | B2 | 9/2003 | Kuckertz et al. |
| 6,664,737 | B1 | 12/2003 | Berry et al. |
| 6,774,018 | B2 | 8/2004 | Mikhael et al. |
| 6,886,320 | B2 | 5/2005 | Rowan |
| 6,896,932 | B2 | 5/2005 | Huang et al. |
| 6,966,351 | B2 | 11/2005 | Scarpitti |
| 6,988,520 | B2 | 1/2006 | Watkins et al. |
| 7,252,129 | B2 | 8/2007 | Michiels et al. |
| 7,259,199 | B2 | 8/2007 | Sandstrom |
| 7,353,852 | B2 | 4/2008 | Hitotsuyanagi et al. |
| 7,455,892 | B2 | 11/2008 | Goodwin et al. |
| 7,517,561 | B2 | 4/2009 | Haack et al. |
| 7,557,019 | B2 | 7/2009 | Mikhael et al. |
| 7,614,436 | B2 | 11/2009 | Michiels et al. |
| 8,053,510 | B2 | 11/2011 | Sandstrom et al. |
| 8,445,074 | B2 | 5/2013 | Siffer et al. |
| 2002/0185206 | A1 | 12/2002 | Pereira et al. |
| 2003/0068449 | A1 | 4/2003 | Steinberg et al. |
| 2004/0022945 | A1 | 2/2004 | Goodwin et al. |
| 2004/0159382 | A1 | 8/2004 | Armellin et al. |
| 2007/0093076 | A1 | 4/2007 | Mikhael et al. |
| 2007/0202270 | A1 | 8/2007 | Rose et al. |
| 2007/0256770 | A1 | 11/2007 | Segawa et al. |
| 2009/0133923 | A1 | 5/2009 | Kotsubo et al. |
| 2009/0238989 | A1 | 9/2009 | Dadheech et al. |
| 2010/0084348 | A1 | 4/2010 | Munn |
| 2011/0121108 | A1 | 5/2011 | Rodewald et al. |
| 2011/1121107 | | 5/2011 | Siffer et al. |
| 2011/0241269 | A1 | 10/2011 | Siffer et al. |
| 2011/0244139 | A1 | 10/2011 | Siffer et al. |
| 2012/0067485 | A1 | 3/2012 | Imhoff et al. |

FOREIGN PATENT DOCUMENTS

| | | |
|---|---|---|
| CN | 101096820 A | 1/2008 |
| CN | 102212963 A | 10/2011 |
| EP | 0346055 A2 | 12/1989 |
| EP | 0901914 A1 | 3/1999 |
| EP | 1302503 A2 | 4/2003 |
| EP | 1726615 A1 | 11/2006 |
| EP | 2371882 A1 | 10/2011 |
| JP | S59179632 A | 10/1984 |
| JP | 2004360113 A | 12/2004 |
| JP | 2009275303 A | 11/2009 |
| WO | WO0228548 A2 | 4/2002 |
| WO | WO03086031 A1 | 10/2003 |
| WO | WO2006048649 A1 | 5/2006 |
| WO | WO2006135347 A1 | 12/2006 |
| WO | WO2008057759 A2 | 5/2008 |
| WO | WO2008060522 A2 | 5/2008 |

OTHER PUBLICATIONS

Kang, H.M., et al., Surface Modification of Steel Tire Cords via Plasma Etching and Plasma Polymerization Coating: Part II. Characterization, Characterization, Mar. 22, 2000, Elastomer Seoul.
Kang, H.M., et al., ThomsonXP-002655343, No date, No volume number.
EPO Search Report dated Jan. 27, 2014.
Delattre, J.L., Plasma-polymerized thiophene films for enhanced rubber-steel bonding Applied Surface Science, vol. 252, Issue 10, Mar. 15, 2006, pp. 3912-3919.
HRJ-11995. [Online] Available: http://siigroup.com/productinfo.asp?ID=99.
Hercolyn® D. [Online] Available: http:www.pinovasolutions.com.
SP-1056. [Online] Available: http://siigroup.com/productinfo.asp?ID=126.
Staybelite® Ester 10. [Online] Available: http://www.pinovasolutions.com.
TPS 37™ LS. Online] Available: http://www.arkema-inc.com/tds/1000.pdf.

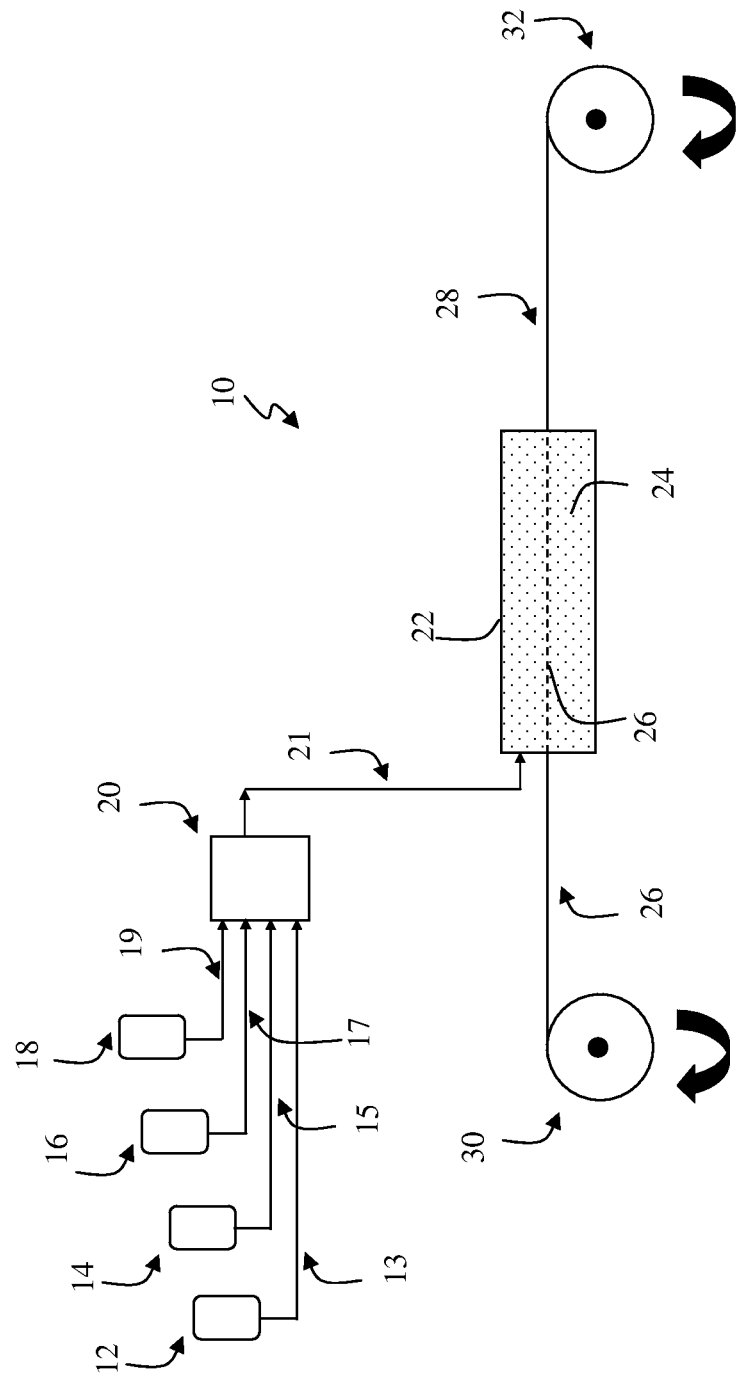

ATMOSPHERIC PLASMA TREATMENT OF REINFORCEMENT CORDS AND USE IN RUBBER ARTICLES

BACKGROUND

Rubber is typically reinforced with various embodiments of textile, glass or steel fibers to provide basic strength, shape, stability, and resistance to bruises, fatigue, and heat. These fibers may be twisted into plies and cabled into cords. Rubber tires of various construction as well as various industrial products such as belts, hoses, seals, bumpers, mountings, and diaphragms can be prepared using such cords.

Manufacturers of rubber reinforced articles have long realized the importance of the interfacial adhesion of reinforcement of its rubber environment. Specialized coatings such are resorcinol/formaldehyde latex adhesives for polymeric cords and brass plating for steel cords are typically applied to fiber and wire reinforcements to enable them to function effectively for tire use. In addition, the compounds used to coat these reinforcements are usually specially formulated to develop adhesion. For example, many tire manufacturers use various cobalt salts as bonding promoters in their steel cord wire coats, as well as using relatively high ratios of sulfur to cure accelerator. The bonding promoters are added through compounding. To achieve a maximum bonding strength, an excess amount of cobalt salt is often added to the wire coat. Since only a very small portion of the cobalt salt may be engaged in the rubber-metal interfacial bonding reaction, most of the cobalt salts remained in the compound as excess cobalt without any contribution to the bonding. Cobalt is expensive and may even cause aging problems of the rubber when used in excess, as well as having objectionable environmental effects.

It continuously remains desirable to improve adhesion of reinforcement cords to rubber while simultaneously improving the properties of the coat compounds and reducing their cost.

SUMMARY OF THE INVENTION

The present invention is directed to a method of making a cord-reinforced rubber article, comprising the steps of (A) atomizing a mixture of a halogenated hydrocarbon, a carrier gas, and at least one member of the group consisting of hydrocarbon sulfides and polymerizable monomers, to form an atomized mixture;

(B) generating an atmospheric pressure plasma from the atomized mixture;

(C) exposing a reinforcement cord to the atmospheric pressure plasma to produce a treated reinforcement cord; and (D) contacting the treated reinforcement cord with a rubber composition comprising a diene based elastomer and at least one member of the group consisting of methylene donors and methylene acceptors.

The invention is further directed to cord reinforced rubber articles made by the method.

BRIEF DESCRIPTION OF THE DRAWINGS

FIG. 1 is a schematic representation of one embodiment of the present invention.

DETAILED DESCRIPTION OF THE INVENTION

There is disclosed a method of making a cord-reinforced rubber article, comprising the steps of (A) atomizing a mixture of a halogenated hydrocarbon, a carrier gas, and at least one member of the group consisting of hydrocarbon sulfides and polymerizable monomers, to form an atomized mixture;

(B) generating an atmospheric pressure plasma from the atomized mixture;

(C) exposing a reinforcement cord to the atmospheric pressure plasma to produce a treated reinforcement cord; and (D) contacting the treated reinforcement cord with a rubber composition comprising a diene based elastomer and at least one member of the group consisting of methylene donors and methylene acceptors.

With reference now to the drawing, one embodiment of a method of treating a reinforcement cord according to the present invention is illustrated. In the process 10, carrier gas 13 is fed from storage vessel 12 to atomizer 20 along with monomer 15 from storage vessel 14, halogenated hydrocarbon 17 from storage vessel 16. Optionally, one or more curatives 19 may be added from storage vessel 18. Carrier gas 13, monomer 15, halogenated hydrocarbon 17 and optional curative 19 are atomized in atomizer 20 to form atomized mixture 21. Atomized mixture 21 is sent to plasma generator 22, where atmospheric plasma 24 is generated from atomized mixture 21. Reinforcement cord 26 is unwound from spool 30 and conveyed through plasma generator 22 and atmospheric plasma 24 for deposition of a surface treatment by the plasma 24. Treated reinforcement cord 28 exits plasma generator 22 and is wound onto spool 32 for storage.

The plasma generator may be any suitable plasma generation device as are known in the art to generate atmospheric pressure plasmas, such as atmospheric pressure plasma jet, atmospheric pressure microwave glow discharge, atmospheric pressure glow discharge, and atmospheric dielectric barrier discharge. In one embodiment, the plasma generator is of the dielectric barrier discharge type. The dielectric barrier discharge apparatus generally includes two electrodes with a dielectric-insulating layer disposed between the electrodes and operate at about atmospheric pressures. The dielectric barrier discharge apparatus does not provide one single plasma discharge, but instead provides a series of short-lived, self terminating arcs, which on a long time scale (greater than a microsecond), appears as a stable, continuous, and homogeneous plasma. The dielectric layer serves to ensure termination of the arc. Further reference may be made to U.S. Pat. No. 6,664,737 for its teaching regarding the operation of a dielectric barrier discharge apparatus.

By atmospheric pressure plasma, it is meant that the pressure of the plasma is equal to or slightly above the ambient pressure of the surroundings. The pressure of the plasma may be somewhat higher than ambient, such that the plasma pressure is sufficient to induce the desired flow rate through the atomizer and plasma generator.

The atomized mixture includes a carrier gas, at least one monomer, and a halogenated hydrocarbon.

Suitable carrier gas includes any of the noble gases including helium, argon, xenon, and neon. Also suitable as carrier gas are nitrogen, carbon dioxide, nitrous oxide, carbon monoxide, and air. In one embodiment, the carrier gas is argon.

The hydrocarbon sulfide includes sulfur olefins and polysulfide compounds represented by the general formula (2).

$$R^1-S_x-R^2 \tag{2}$$

where $R^1$ and $R^2$ are univalent hydrocarbon groups, which may be the same or different, and x is an integer of 2 or more.

In one embodiment, $R^1$ and $R^2$ may be straight-chain or branched saturated or unsaturated aliphatic hydrocarbon groups of 2 to 20 carbon atoms (e.g. alkyl groups or alkenyl groups), or aromatic hydrocarbon groups of 6 to 26 carbon atoms, such as an ethyl group, propyl group, butyl group, nonyl group, dodecyl group, propenyl group, butenyl group, benzyl group, phenyl group, tolyl group, or hexyl phenyl group.

Specific examples of these that may be given include sulfur diisobutyl disulfide, dioctyl polysulfide, di-tertiary nonyl polysulfide, di-tertiary butyl polysulfide, di-tertiary benzyl polysulfide, di-tertiary-dodecyl polysulfide, or olefin sulfides obtained by sulfurizing with a sulfurizing agent olefins such as poly-isobutylene or terpene.

The amount of hydrocarbon sulfide may be expressed as a percent of the total components in the atomized mixture excluding the carrier gas, i.e., on a carrier gas free basis. In one embodiment, the amount of monomer ranges from 10 to 90 percent by weight of the total components in the atomized mixture on a carrier gas free basis. In one embodiment, the amount of hydrocarbon sulfide ranges from 20 to 50 percent by weight of the total components in the atomized mixture on a carrier gas free basis.

Suitable polymerizable monomers include any of the various monomers used to produce elastomers for use in tires. Such monomers include conjugated diolefin monomers and vinyl aromatic monomers. The conjugated diolefin monomers generally contain from 4 to 12 carbon atoms. In particular 1,3-butadiene and isoprene may be used. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Further suitable are short chain length oligomers of polybutadiene and polyisoprene. Also suitable is squalene.

Some further representative examples of polymerizable, ethylenically unsaturated monomers that can potentially be used include alkyl acrylates, such as methyl acrylate, ethyl acrylate, butyl acrylate, methyl methacrylate and the like; vinylidene monomers having one or more terminal CH2═CH— groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Vinyl aromatic monomers are another group of polymerizable, ethylenically unsaturated monomers which may be used. Such vinyl aromatic monomers typically contain from 8 to 20 carbon atoms. Usually, the vinyl aromatic monomer will contain from 8 to 14 carbon atoms. In one embodiment the vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

The amount of polymerizable monomer may be expressed as a percent of the total components in the atomized mixture excluding the carrier gas, i.e. on a carrier gas free basis. In one embodiment, the amount of monomer ranges from 10 to 90 percent by weight of the total components in the atomized mixture on a carrier gas free basis. In one embodiment, the amount of monomer ranges from 20 to 50 percent by weight of the total components in the atomized mixture on a carrier gas free basis.

Suitable halogenated hydrocarbon includes for example dichloromethane (methylene chloride). Other nonlimiting examples of chlorinated hydrocarbons include trichloromethane (chloroform), carbon tetrachloride, trichloroethane, chlorobutane, 1-chlorohexane, 1,6-dichlorohexane, 1,2-dichloropropane, 2-chloropropane, 2-chloro-2-methylpropane, allyl chloride, and benzyl chloride. Brominated hydrocarbons may also be used, such asbromoethane, dibromomethane (methylene bromide), tribromomethane (bromoform), and the like, although chlorinated hydrocarbons are preferred.

The amount of halogenated hydrocarbon may be expressed as a percent of the total components in the atomized mixture with the exception of the carrier gas, i.e., on a carrier gas free basis. In one embodiment, the amount of halogenated hydrocarbon ranges from 90 to 10 percent by weight of the total components in the atomized mixture on a carrier gas free basis. In one embodiment, the amount of halogenated hydrocarbon ranges from 80 to 50 percent by weight of the total components in the atomized mixture on a carrier gas free basis.

Optionally, the atomized mixture may include at least one curative, such as sulfur donors and accelerators. Alternatively, curatives may be absent from the material deposited on the reinforcement cord from the atmospheric plasma. In this case, curatives present in a rubber composition contacted with the reinforcement cord may serve to cure the deposited material via migration of the curatives from the rubber composition to the material deposited on the cord prior to cure. When used in the atomized mixture, curatives may be present in an amount ranging from 0.5 to 2 percent by weight on a carrier gas free basis.

The reinforcement cord is constructed of any of the various metallic reinforcement materials commonly used in cord reinforced rubber articles, including tires. In one embodiment, the reinforcement cord includes steel, galvanized steel, zinc plated steel and brass plated steel.

The reinforcement cord is exposed to the atmospheric plasma for a time sufficient to deposit an adhesively effective amount of polymerized or partially polymerized monomer onto the cord surface. By adhesively effective amount, it is meant that the treated cord will show increased adhesion to a cured rubber compound compared to an untreated cord, as measured by a standard adhesion test such as ASTM Standard D2229-73. Generally, the exposure time required will depend on the concentration of monomer in the atomized mixture, the flow rate of atomized mixture into the plasma generator, and the power input to the plasma generator. For a batch process wherein stationary cord is exposed to an atmospheric plasma, the cord is exposed for from 1 to 100 seconds. In a continuous process, the exposure time may be characterized by a residence time expressed as the cord path length (e.g., in centimeters) through the plasma generator divided by the cord transit rate (e.g., in cm/sec). The residence time in such a continuous process would then range from 1 to 100 seconds.

The flow rate of atomized mixture into the plasma generator necessary to obtain an adhesively effective amount of polymerized or partially polymerized monomer onto the cord surface will depend on the desired face velocity in the plasma generator, i.e., the gas velocity (e.g., in cm/sec) passing perpendicular to a characteristic internal crosssectional area of the plasma generator. Necessary flow rate may be determined by one skilled in the art without undue experimentation.

The atmospheric pressure plasma treated cord may be used in a component of a pneumatic tire. The treated cord is calendered or otherwise contacted with a rubber composition to form the tire component using procedures as are known in the art. In various embodiments, the tire component may be a belt, carcass, apex, bead, chipper, flipper, or any other component including a cord reinforcement as are known in the art. In one embodiment, the tire component is a steel belt wherein treated steel reinforcement cords are calendared into a rubber composition.

The rubber composition to be contacted with the treated reinforcement cord includes at least one of methylene donors and methylene acceptors.

In one embodiment, the methylene donor is an N-substituted oxymethylmelamines, of the general formula:

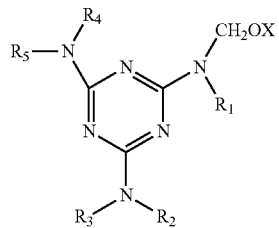

wherein X is hydrogen or an alkyl having from 1 to 8 carbon atoms, $R_1'$ $R_2$, $R_3$, $R_4$ and $R_5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N''-trimethyl/N,N',N''-trimethylolmelamine, hexamethylolmelamine, N,N',N''-di-methylolmelamine, N-methylolmelamine, N,N'-dimethylolmelamine, N,N',N''-tris(methoxymethyl)melamine, N,N'N''-tributyl-N,N',N''-trimethylol-melamine, hexamethoxymethylmelamine, and hexaethoxymethylmelamine. In one embodiment, the N-substituted oxymethylmelamine is hexamethoxymethylmelamine. The N-methylol derivatives of melamine are prepared by known methods.

The amount of N-substituted oxymethylmelamine in the rubber composition may vary. In one embodiment, the amount of N-substituted oxymethylmelamine ranges from 0.5 to 4 phr. In another embodiment, the amount of N-substituted oxymethylmelamine ranges from 1 to 3 phr. The N-substituted oxymethylmelamine may be added as the free compound, or dispersed on a carrier medium such as silica.

In one embodiment, the rubber composition includes a methylene acceptor. The term "methylene acceptor" is known to those skilled in the art and is used to describe the reactant to which a methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof. Examples of methylene acceptors include but are not limited to those disclosed in U.S. Pat. Nos. 6,605,670; 6,541,551; 6,472,457; 5,945,500; 5,936,056; 5,688,871; 5,665,799; 5,504,127; 5,405,897; 5,244,725; 5,206,289; 5,194,513; 5,030,692; 4,889,481; 4,605,696; 4,436,853; and 4,092,455. Examples of modified phenol novolak resins include but are not limited to cashew nut oil modified phenol novolak resin, tall oil modified phenol novolak resin and alkyl modified phenol novolak resin. In one embodiment, the methylene acceptor is resorcinol.

Other examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber stock may vary. In one embodiment, the amount of methylene acceptor, if used, ranges from 0.5 to 5 phr. In another embodiment, the amount of methylene acceptor, if used, ranges from 1 to 3 phr.

In one embodiment, the rubber composition excludes a methylene acceptor. In one embodiment, the rubber composition excludes resorcinol.

It is readily understood by those having skill in the art that the rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. In one embodiment, the addition of carbon black comprises about 10 to 200 parts by weight of diene rubber (phr). In another embodiment, from about 20 to about 100 phr of carbon black is used.

A number of commercially available carbon blacks may be used. Included in, but not limited to, the list of carbon blacks are those known under the ASTM designations N299, N315, N326, N330, N332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 100 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include insoluble sulfur, elemental sulfur (free sulfur) or sulfur donating vulcanizing agents, for example, an amine disulfide, polymeric polysulfide or sulfur olefin adducts. In one embodiment, the sulfur vulcanizing agent is elemental sulfur. In one embodiment, sulfur vulcanizing agents are used in an amount ranging from about 0.5 to about 8 phr. In another embodiment about 3 to about 5 phr of sulfur vulcanizing agents are used.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators may be used, including a primary accelerator which is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. In another embodiment, if a second accelerator is used, the secondary accelerator may be a guanidine, dithiocarbamate, thiuram, or a second sulfenamide.

The tire containing the tire component can be built, shaped, molded and cured by various methods which will be readily apparent to those having skill in such art.

The prepared tire of this invention is conventionally shaped and cured by methods known to those having skill in such art.

While the invention as described herein has been directed to tire cords and tires, the method is not so limited. Other applications of reinforcement cords, which includes tire cords, as treated by the methods described herein can be envisioned. Any rubber or elastomer article of manufacture reinforced with reinforcement cords can utilize cords as treated by the methods described herein. For example, applications of the treated reinforcement cords using the plasma methods described herein include reinforced hoses, transmission belts, drive belts, air springs, conveyor belts, drive tracks, and the like. Thus, the methods as described herein as suitable for treatment of tire cords are equally applicable to the treatment of any reinforcement cord as used in reinforced rubber or elastomer articles of manufacture.

The invention is further described with reference to the following examples.

EXAMPLE 1

In this example, the effect of plasma treatment with a hydrocarbon sulfide (di-t-nonylpolysulfide, from Arkema) on the adhesion of metal to rubber is illustrated. Galvanized steel coupons were treated with an atmospheric argon plasma in a Plasmatreater 400 AS from Plasmatreat US LP, Elgin, Ill. The plasma was generated using a ionization argon gas flow rate of 800 L/hour, a plasma frequency of 25 kHz, duty cycle of 42 percent torch velocity of 10 m/min, a torch/raster offset of 1 mm, a treatment number of 1, and a nozzle height of 5 mm.

Hot-dip galvanized steel coupons (1 inch×5 inches) were cleaned by sandblasting to remove surface layer chemical species to expose essentially pure metal surfaces, followed by an ultrasonic bath in acetone and air drying. Cleaned galvanized steel coupons were exposed to an atmospheric plasma generated from a nebulized gas mixture of various compositions as given in Table 1. The liquid species were nebulized into argon gas (0.8 L/min) using an ultrasonic nebulizer from Sonaer Ultrasonics (www. sonozap.com, Model 241PG, frequency—2.4 MHz, ultrasonic power—12-15 watts) operated at 65 percent of the ultrasonic power. The nebulized mixture as then mixed with the ionization argon gas stream to form the final plasma.

Adhesion of plasma treated galvanized steel coupons to rubber was tested with a lap shear test. Each lap shear specimen was made by interposing a mylar sheet with a precut window of 15 mm by 25 mm between a plasma treated galvanized steel coupon and an uncured wirecoat rubber compound sheet, thus defining the contact area as the dimensions of the window. The galvanized steel coupon was offset from the rubber sheet an amount sufficient to allow grip during the lap shear test. A brass coupon identical in size to the galvanized steel coupon was then laid over the rubber sheet on the side opposite of the mylar sheet and galvanized steel coupon. The brass coupon was offset to allow grip during the lap shear test. The layered specimen was then cured in a press at 10 tons pressure for 30 minutes at 155° C. Cured specimens were tested for lap shear strength in a Instron machine using a 50 kN load cell. Results of the lap shear tests with standard deviations are given in Table 2, with all results representing the average of at least four duplicate samples.

An additional control sample 5 using a brass coupon in place of the galvanized steel coupon was prepared and tested for lap shear.

As seen in Tables 1 and 2, the presence of the di-t-nonylpolysulfide in the plasma treatment of the galvanized steel coupon (Sample 4) gives rubber adhesion comparable to that of the brass coupon (Sample 5), both in terms of the fracture force and fracture energy. By comparison, the galvanized steel coupon treated with a plasma including squalene (Sample 3) shows lower adhesion. The inclusion of the hydrocarbon sulfide material thus leads to superior adhesion as compared to the non-sulfur containing hydrocarbon.

TABLE 1

| Sample No. | Type | Plasma Composition (in Argon) |
|---|---|---|
| 1 | control | Ar only |
| 2 | control | 100% $CH_2Cl_2$ |
| 3 | comparative | 60 vol % $CH_2Cl_2$/40 vol % squalene |
| 4 | invention | 60 vol % $CH_2Cl_2$/40 vol % di-t-nonylpolysulfide |
| 5 | control | none |
| 6 | invention | 60 vol % allyl chloride/40 vol % di-t-nonylpolysulfide |

TABLE 2

| Sample No. | Type | Fracture Force[1], kN | Fracture Energy[2], J/m² |
|---|---|---|---|
| 1 | control | 1.23 ± 0.18 | 1013 ± 160 |
| 2 | control | 4.00 ± 0.17 | 5903 ± 999 |
| 3 | comparative | 4.93 ± 0.38 | 12827 ± 3387 |
| 4 | inventive | 5.43 ± 0.35 | 18213 ± 3387 |
| 5 | control[3] | 5.28 ± 0.25 | 18960 ± 3413 |
| 6 | inventive | 4.94 ± 0.61 | 10952 ± 5307 |

[1]Fracture force is the force applied at failure of the lap shear specimen
[2]Fracture energy is obtained by integrating the area under the force vs displacement curve as measured during Instron pull, then referenced to the mylar window dimensions
[3]Sample 5 made with a brass coupon in place of the galvanized steel coupon

EXAMPLE 2

In this example, the effect of plasma treatment with a hydrocarbon sulfide (di-t-nonylpolysulfide, from Arkema) on the adhesion of metal to a rubber composition containing an N-substituted oxymethylmelamine is illustrated.

Various rubber compounds based on a tire wirecoat composition containing hexamethoxymethylmelamine and resorcinol were mixed and compounded into rubber sheets. Each of the rubber compositions were identical in formulation exception for the presence or absence of hexamethoxymethylmelamine and resorcinol as shown in Table 3, with amounts given in phr (parts by weight, per hundred parts by weight of rubber). Each rubber compound was prepared in a lap shear specimen and tested following the procedures of Example 1, with plasma treated coupons having been exposed to an atmospheric plasma generated from a nebulized precursor mixture of 60 vol % CH2Cl2/40 vol % di-t-nonylpolysulfide. Results of the lap shear tests with standard deviations are given in Table 3, with all results representing the average of at least four duplicate samples.

TABLE 3

| Sample No.[1] | Type | HMMM[2] | Resorcinol | Fracture Force[3], kN |
|---|---|---|---|---|
| 7 | invention | 3 | 4 | 4.66 ± 0.29 |
| 8 | control | 0 | 0 | 0.86 ± 0.10 |
| 9 | invention | 0 | 4 | 2.20 ± 0.08 |
| 10 | invention | 3 | 0 | 4.58 ± 0.52 |

[1]Each rubber compound was otherwise identical, comprising natural rubber, carbon black, sulfur, and accelerator.
[2]Hexamethoxymethylmelamine
[3]Fracture force is the force applied at failure of the lap shear specimen As seen in Table 3, use of the combination of hexamethoxymethylmelamine and resorcinol in combination in Sample 7 gave superior adhesion of the metal to rubber. Surprisingly and unexpectedly, use of hexamethoxymethylmelamine without resorcinol in Sample 10 gave essentially equal level of adhesion as compared to the combined hexamethoxymethylmelamine and resorcinol of Sample 7.

EXAMPLE 3

In this example, the effect of various resins on the adhesion rubber to plasma treated metal is illustrated. Various rubber compounds based on a tire wirecoat composition containing hexamethoxymethylmelamine and resorcinol were mixed and compounded into rubber sheets. Each of the rubber compositions were identical in formulation exception for the presence or absence of hexamethoxymethylmelamine, resorcinol, or various resins as shown in Table 4, with amounts given in phr (parts by weight, per hundred parts by weight of rubber).

Each rubber compound was prepared in a lap shear specimen and tested following the procedures of Example 1, with plasma treated coupons having been exposed to an atmospheric plasma generated from a nebulized gas mixture of 0.8 L/min Ar and 60 vol % $CH_2Cl_2$/40 vol % di-t-nonylpolysulfide. Results of the lap shear tests with standard deviations are given in Table 4, with all results representing the average of at least four duplicate samples.

As seen in Table 4, none of the alternative resins showed an improvement in adhesion when used in place of the HMMM/resorcinol, as was the case with HMMM by itself in Example 2.

TABLE 4

| | Sample No.[1] | | | | | | | |
|---|---|---|---|---|---|---|---|---|
| | 11 | 12 | 13 | 14 | 15 | 16 | 17 | 18 |
| HMMM[2] | 3 | 0 | 0 | 0 | 0 | 0 | 0 | 3 |
| Resorcinol | 0 | 0 | 0 | 0 | 0 | 0 | 0 | 4 |
| Cashew Nut Oil Resin[3] | 4 | 0 | 0 | 0 | 0 | 0 | 0 | 0 |
| Br-Octylphenol Resin[4] | 0 | 4 | 0 | 0 | 0 | 0 | 0 | 0 |
| Rosin Methyl Ester[5] | 0 | 0 | 4 | 0 | 0 | 0 | 0 | 0 |
| t-Octylphenol/formaldehyde[6] | 0 | 0 | 0 | 4 | 0 | 0 | 0 | 0 |
| Rosin Glycerin Ester[7] | 0 | 0 | 0 | 0 | 4 | 0 | 0 | 0 |
| 4-t-butylphenol/Acetylene[8] | 0 | 0 | 0 | 0 | 0 | 4 | 0 | 0 |
| Fracture Force, kN | 2.85 | 0.19 | 0.45 | 0.12 | 0.20 | 0.12 | 0.43 | 3.83 |
| Standard deviation | 0.17 | 0.04 | 0.15 | 0.02 | 0.12 | 0.06 | 0.17 | 0.55 |

[1]Each rubber compound was otherwise identical, comprising natural rubber, carbon black, sulfur, and accelerator.
[2]Hexamethoxymethylmelamine
[3]Cashew nut shell oil-modified phenolic novolac resin, e.g. HRJ-11995 from SI Group
[4]Brominated t-octylphenol resin, e.g. SP-1056 from SI Group
[5]Methyl ester of hydrogenated rosin, e.g. Hercolyn ® D from Pinova
[6]Condensation resin of 4-t-octylphenol and formaldehyde, e.g. SP-1068 from SI Group
[7]Glycerine ester of hydrogenated rosin, e.g. Staybelite ® Ester 10 from Pinova or Eastman
[8]4-t-butylphenol-acetylene resin Standard brass-coated wire technology requires long cure times and high sulfur levels to general good adhesion between the rubber compound and the wire via interaction of copper from the brass wire and sulfur from the rubber compound to general copper sulfide. Additionally, wire coat compounds contain cobalt salts that aid in preventing the breakdown of the copper-sulfur interaction over time as well as resins to increase compound adhesion and stiffness.

As seen in the results of the present invention, plasma coated wire technology allows the potential for the use of rubber formulations atypical of wire coat compounds that may be better for long term adhesion between the wire and rubber. The technology may also allow the elimination of cobalt salts, some resins, and resorcinol, which is beneficial from an environmental and cost standpoint. In one embodiment, then, the rubber composition in contact with the plasma treated reinforcement cord is exclusive of cobalt compounds. In one embodiment, the rubber composition in contact with the plasma treated reinforcement cord is exclusive of resins other than N-substituted oxymethylmelamines. In one embodiment, the rubber composition in contact with the plasma treated reinforcement cord is exclusive of resorcinol. The technology may also allow the use of steel cord that is not brass coated, again beneficial from an environmental and cost standpoint. In one embodiment, then, the plasma treated reinforcement cord is exclusive of brass or copper.

What is claimed is:

1. A method of making a cord-reinforced rubber article, comprising the steps of
   (A) atomizing a mixture of a halogenated hydrocarbon, a carrier gas, and a hydrocarbon sulfide, to form an atomized mixture;
   (B) generating an atmospheric pressure plasma from the atomized mixture;
   (C) exposing a reinforcement cord to the atmospheric pressure plasma to produce a treated reinforcement cord; and
   (D) contacting the treated reinforcement cord with a rubber composition comprising a diene based elastomer and at least one member of the group consisting of methylene donors and methylene acceptors.

2. The method of claim 1, wherein the at least one member of the group consisting of methylene donors and methylene acceptors is a methylene donor and is an N-substituted oxymethylmelamine of the general formula:

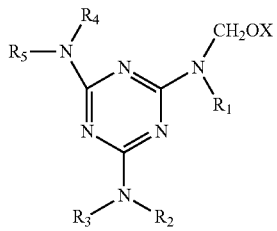

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ or their condensation products.

3. The method of claim 2, wherein the N-substituted oxymethylmelamine is selected from the group consisting of hexakis-(methoxymethyl)melamine, N,N',N''-trimethyl-N,N',N''-trimethylolmelamine, hexamethylolmelamine, N,N',N''-dimethylolmelamine, N-methylolmelamine, N,N'-dimethylolmelamine, N,N', N''-tris(methoxymethyl)melamine, N,N',N''-tributyl-N,N',N''-trimethylolmelamine, hexamethoxymethylmelamine, and hexaethoxymethylmelamine.

4. The method of claim 1, wherein the at least one member of the group consisting of methylene donors and methylene acceptors is a methylene acceptor selected from the group consisting of resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof.

5. The method of claim 1, wherein the cord is selected from the group consisting of steel cords, galvanized steel cords, zinc plated steel cords, and brass plated steel cords.

6. The method of claim 1, wherein the reinforcement cord is conveyed continuously during exposure to the atmospheric pressure plasma.

7. The method of claim 1, wherein the carrier gas is selected from the group consisting of argon, helium, neon, xenon, nitrogen, carbon dioxide, nitrous oxide, carbon monoxide, and air.

8. The method of claim 1, wherein the hydrocarbon sulfide is represented by the general formula (2)

$$R^1-S_x-R^2 \qquad (2)$$

where $R^1$ and $R^2$ may be the same or different and are straight-chain or branched saturated or unsaturated aliphatic hydrocarbon groups of 2 to 20 carbon atoms, or aromatic hydrocarbon groups of 6 to 26 carbon atoms, and x is an integer of 2 or more.

9. The method of claim 1, wherein the hydrocarbon sulfide is selected from the group consisting of diisobutyl disulfide, dioctyl polysulfide, di-tertiary nonyl polysulfide, di-tertiary butyl polysulfide, di-tertiary benzyl polysulfide, di-tertiary-dodecyl polysulfide, and olefin sulfides.

10. The method of claim 1, wherein the halogenated hydrocarbon is selected from the group consisting of dichloromethane (methylene chloride), trichloromethane (chloroform), carbon tetrachloride, trichloroethane, chlorobutane, bromoethane, dibromomethane (methylene bromide), and tribromomethane (bromoform).

11. The method of claim 1, wherein the hydrocarbon sulfide is present in the atomized mixture in a concentration range of from 10 to 90 percent by weight on a carrier gas free basis, and the halogenated hydrocarbon is present in the atomized mixture in a concentration range of from 90 to 10 percent by weight on a carrier gas free basis.

12. The method of claim 1, wherein the hydrocarbon sulfide is present in the atomized mixture in a concentration range of from 20 to 50 percent by weight on a carrier gas free basis, and the halogenated hydrocarbon is present in the atomized mixture in a concentration range of from 80 to 50 percent by weight on a carrier gas free basis.

* * * * *